United States Patent
Park et al.

(10) Patent No.: US 12,277,026 B2
(45) Date of Patent: Apr. 15, 2025

(54) ERROR CORRECTION CIRCUIT CAPABLE OF AUTOMATICALLY COMPENSATING FOR CLOCK MARGIN AND METHOD OF OPERATING THE SAME

(71) Applicant: Samsung Electronics Co., Ltd., Suwon-si (KR)

(72) Inventors: Jeong Hoan Park, Suwon-si (KR); Yeon Soo Kwon, Suwon-si (KR); Hancheon Yun, Suwon-si (KR); Jungyu Lee, Suwon-si (KR); Jaeseung Jeong, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 24 days.

(21) Appl. No.: 18/472,682

(22) Filed: Sep. 22, 2023

(65) Prior Publication Data
US 2024/0303153 A1 Sep. 12, 2024

(30) Foreign Application Priority Data
Mar. 6, 2023 (KR) .......... 10-2023-0029462

(51) Int. Cl.
*G06F 11/07* (2006.01)
(52) U.S. Cl.
CPC .............. *G06F 11/0793* (2013.01)
(58) Field of Classification Search
None
See application file for complete search history.

(56) References Cited

U.S. PATENT DOCUMENTS

| | | | |
|---|---|---|---|
| 6,420,915 B2 | 7/2002 | Erickson | |
| 7,911,249 B2 | 3/2011 | Wada | |
| 8,222,943 B2 | 7/2012 | Sood et al. | |
| 8,255,748 B2 | 8/2012 | Moyer et al. | |
| 9,558,309 B2 | 1/2017 | Beerel et al. | |
| 9,875,327 B2 | 1/2018 | Beerel et al. | |
| 9,991,876 B2 | 6/2018 | Jou et al. | |
| 10,534,396 B2 | 1/2020 | Fabrie et al. | |
| 11,699,472 B2* | 7/2023 | Yoon | G11C 7/222 365/233.1 |

(Continued)

OTHER PUBLICATIONS

S. Yasuda and S. Fujita, "Compact Fault Recovering Flip-Flop with Adjusting Clock Timing Triggered by Error Detection," 2007 IEEE Custom Integrated Circuits Conference, San Jose, CA, USA, 2007, pp. 721-724, (Year: 2007).*

*Primary Examiner* — Daniel F. McMahon
(74) *Attorney, Agent, or Firm* — Harness, Dickey & Pierce, P.L.C.

(57) ABSTRACT

An error correction circuit includes a clock delay circuit configured to receive an input clock, delay the input clock by a desired time period to generate a delayed clock, and output one of the input clock and the delayed clock as an output clock in response to a select signal, an error detection circuit configured to, receive the output clock and input data, generate output data and latch data based on the output clock and the input data, and detect a margin error based on the output data and the latch data, and a control circuit configured to correct the detected margin error, the correcting the margin error including adjusting a level of the select signal based on whether the margin error has been detected.

20 Claims, 12 Drawing Sheets

(56) References Cited

U.S. PATENT DOCUMENTS

| | | | | |
|---|---|---|---|---|
| 2005/0141334 A1* | 6/2005 | Jeong | ............... | G11C 29/02 |
| | | | | 365/194 |
| 2020/0057688 A1* | 2/2020 | Waldrop | ............ | G06F 11/1004 |
| 2022/0165322 A1* | 5/2022 | Choi | ............... | G11C 11/4076 |
| 2023/0360689 A1* | 11/2023 | Park | ............... | G11C 11/4076 |
| 2024/0170085 A1* | 5/2024 | Yoon | ............... | G11C 7/1066 |
| 2024/0303153 A1* | 9/2024 | Park | ............... | G06F 11/0793 |

\* cited by examiner

[FIG. 1]
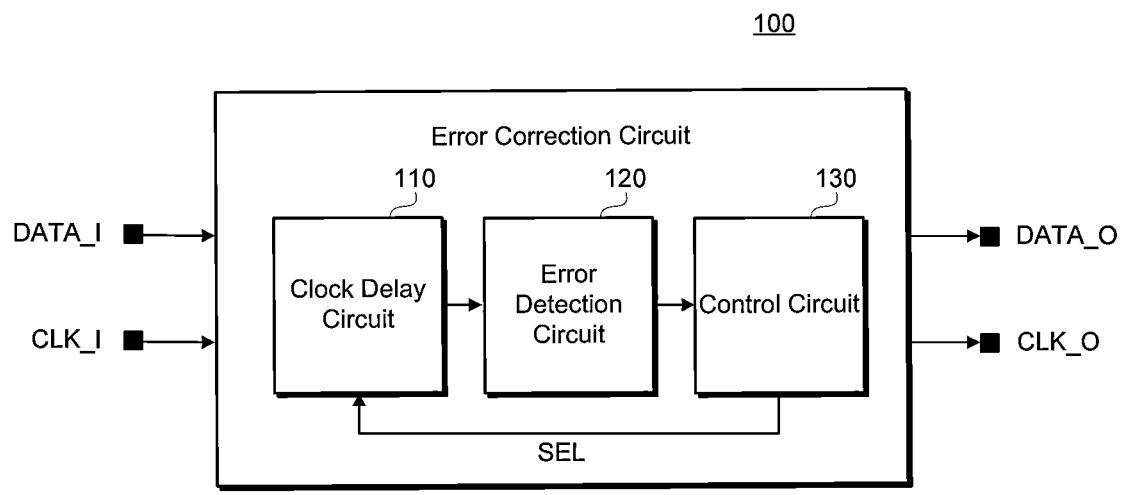
[FIG. 2]
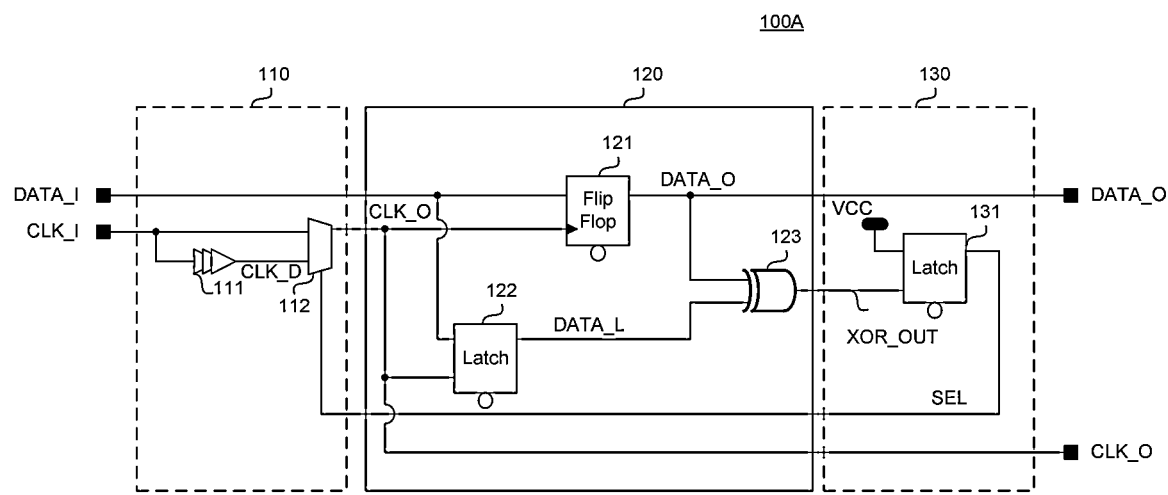

[FIG. 3A]
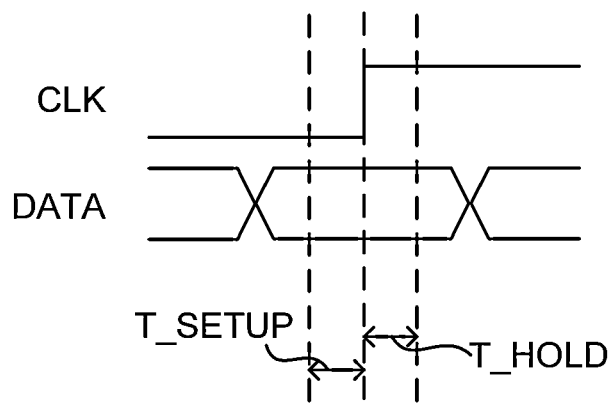
[FIG. 3B]
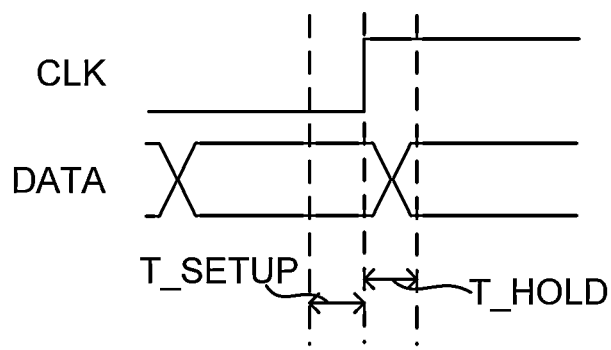
[FIG. 3C]
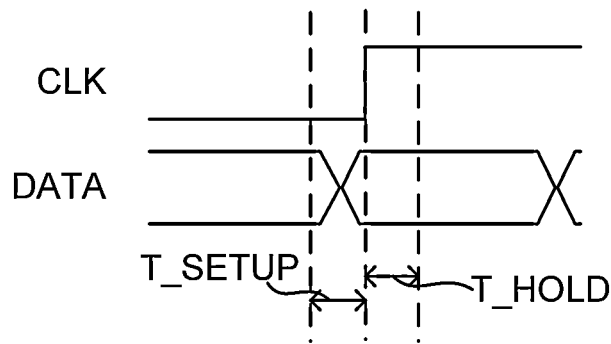

[FIG. 4A]
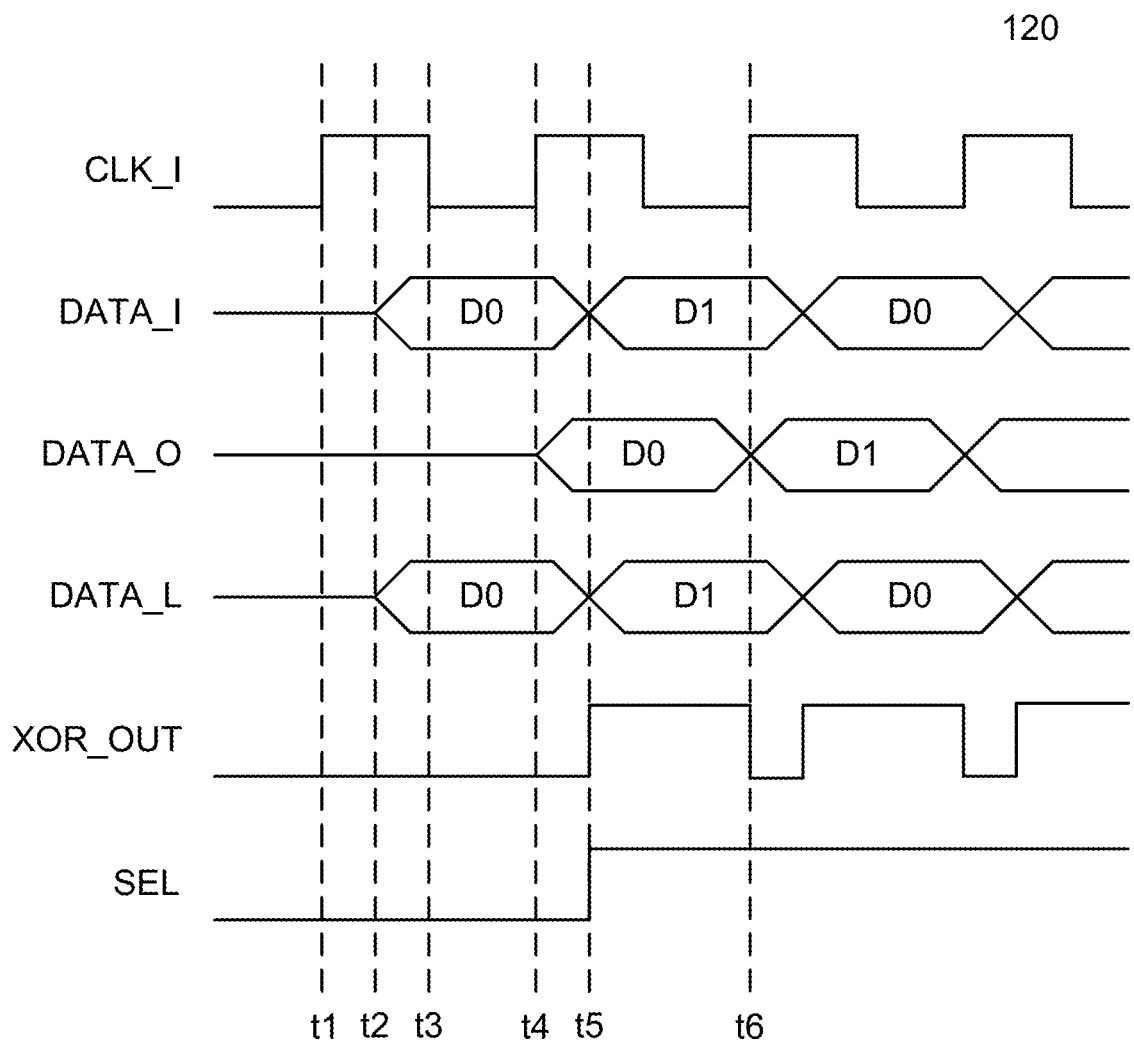

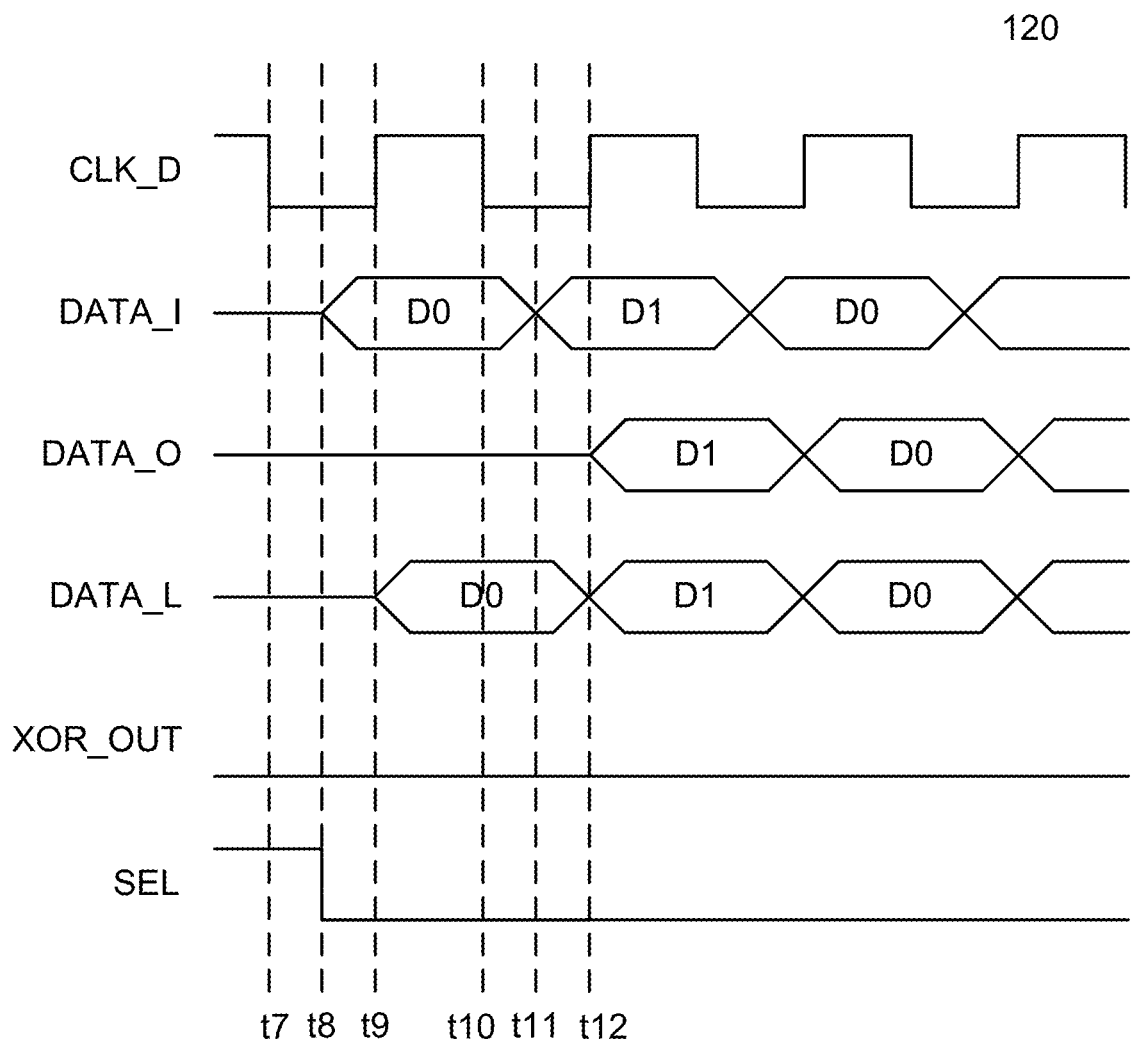
[FIG. 4B]

【FIG. 5】
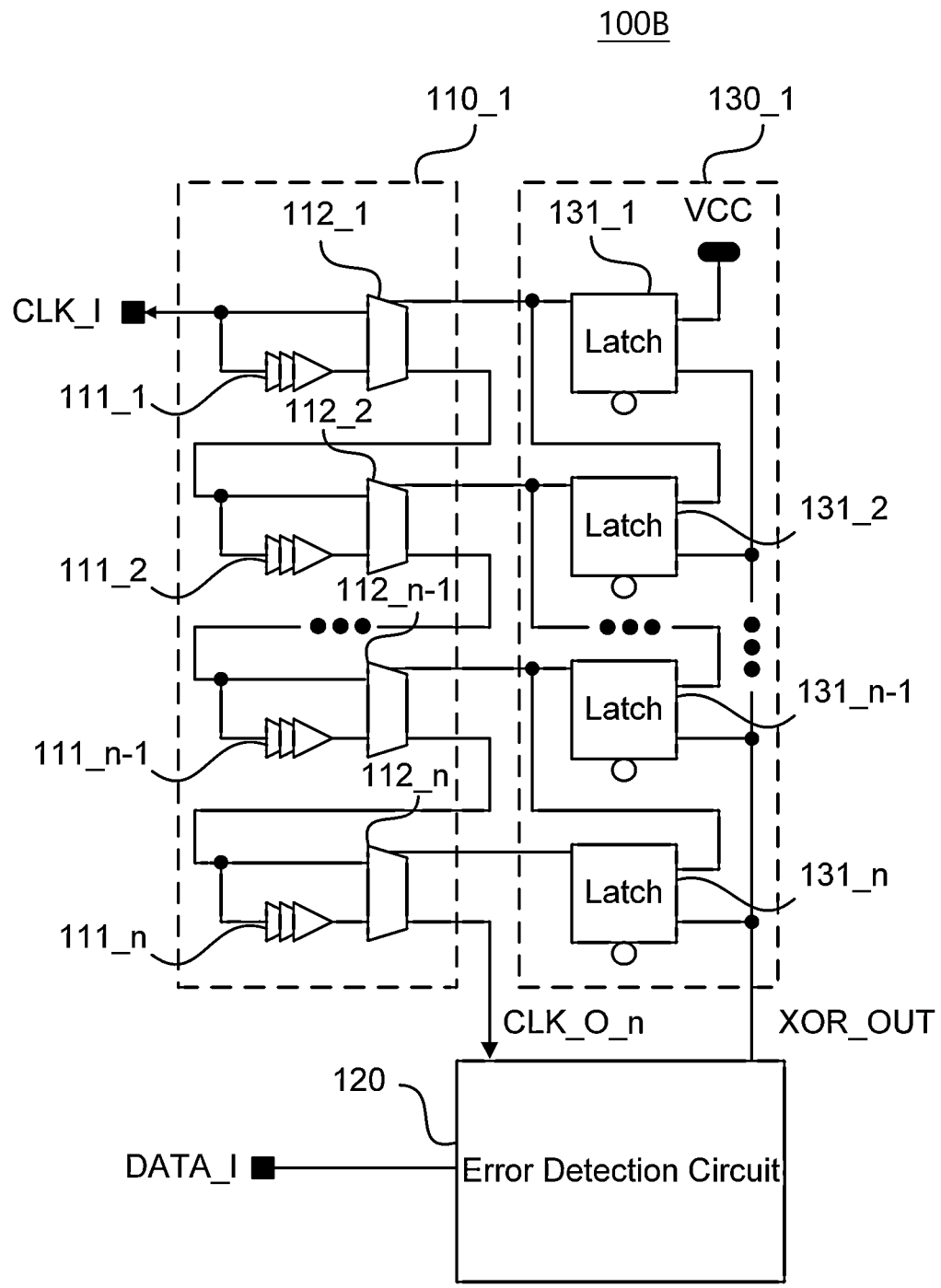

[FIG. 6]
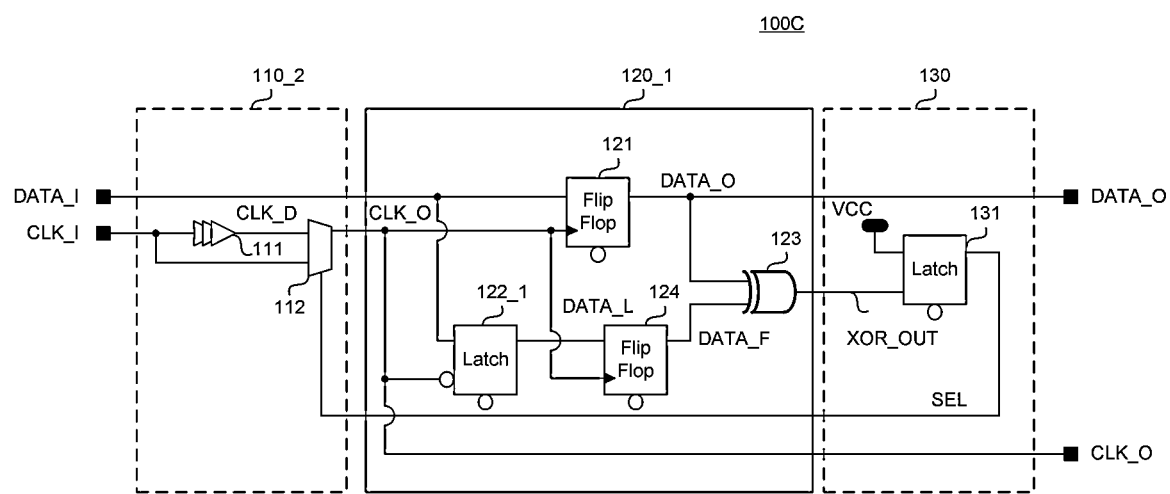

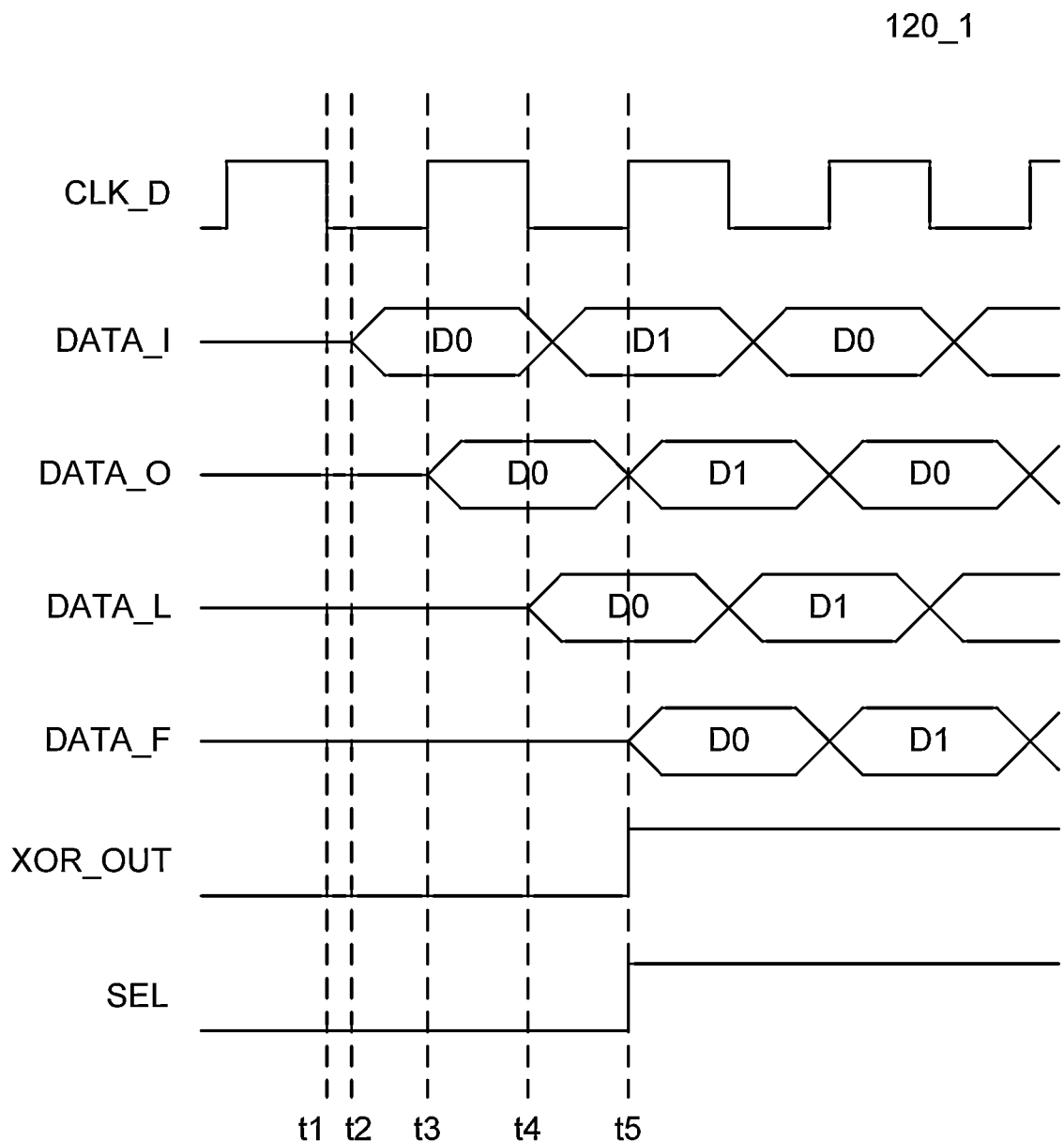

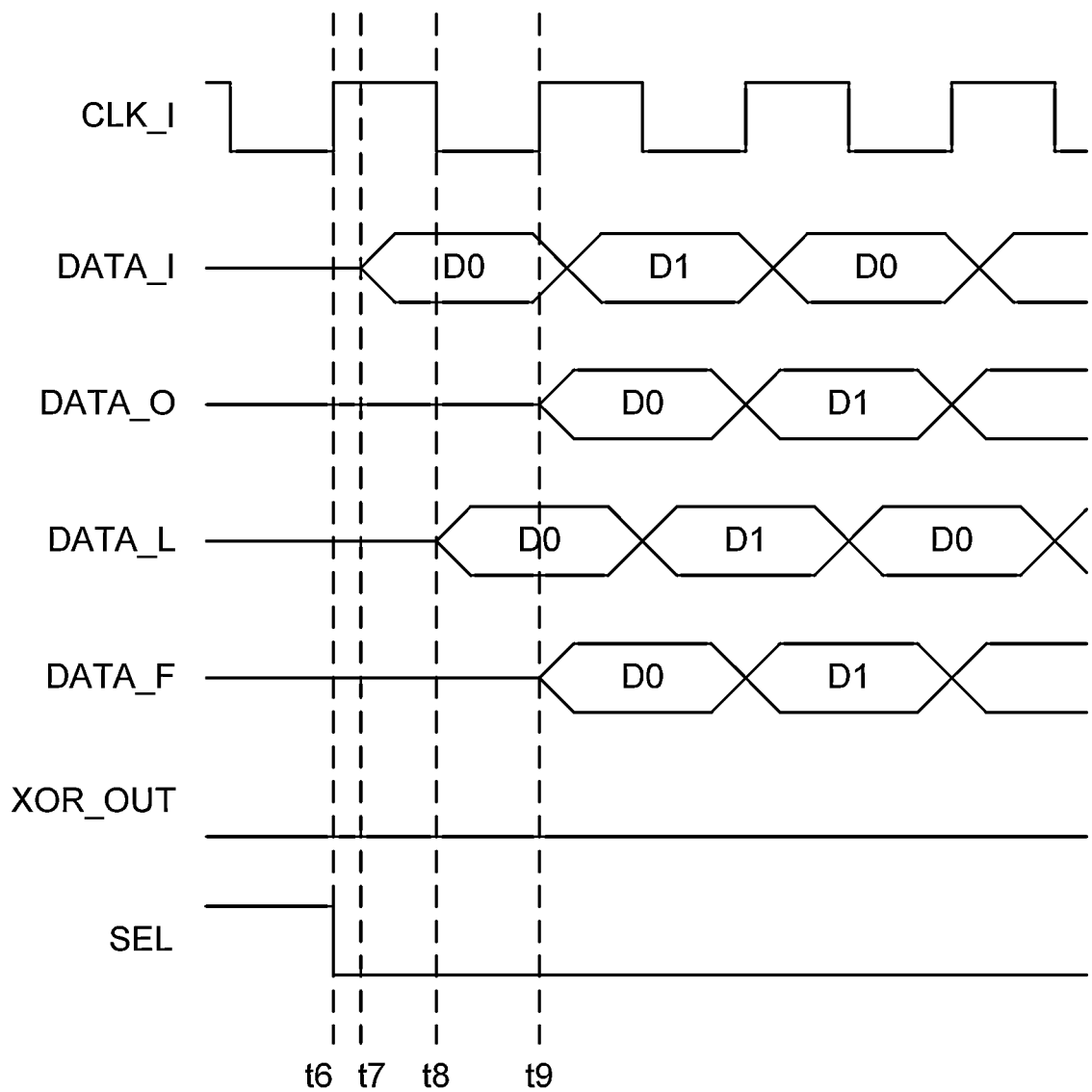
[FIG. 7B]

[FIG. 8]
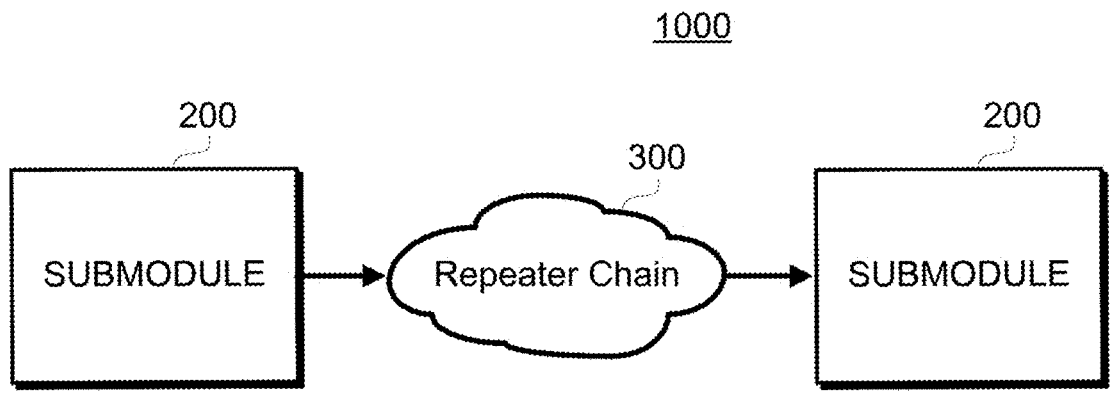
[FIG. 9]
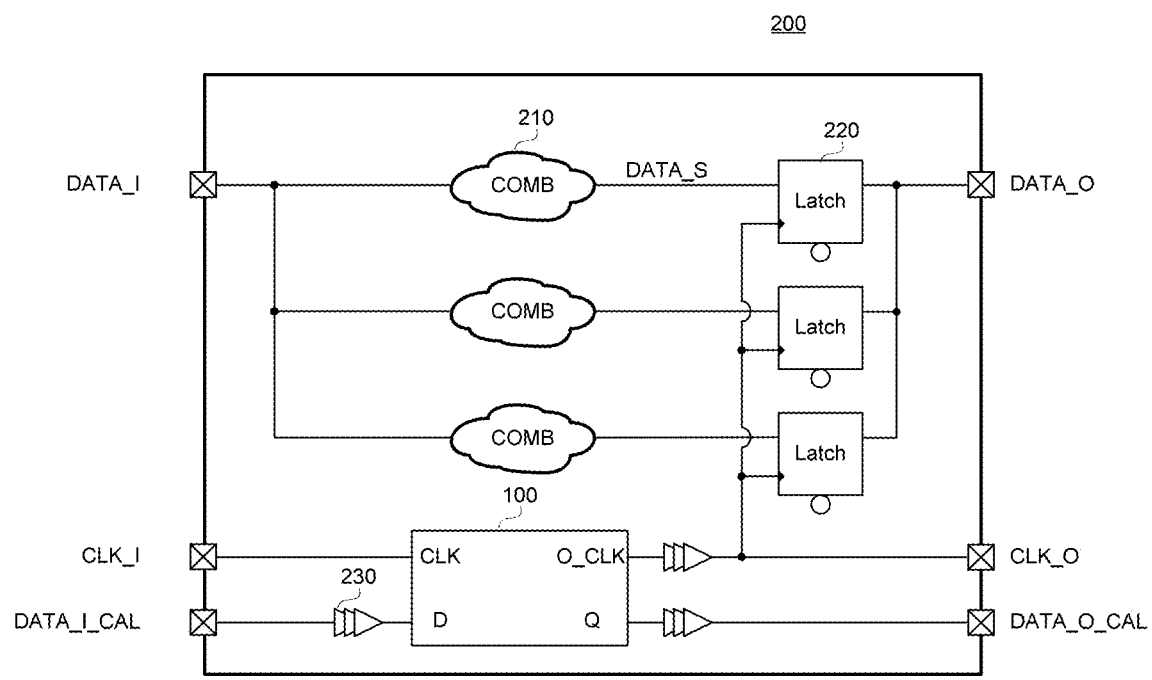

[FIG. 10]
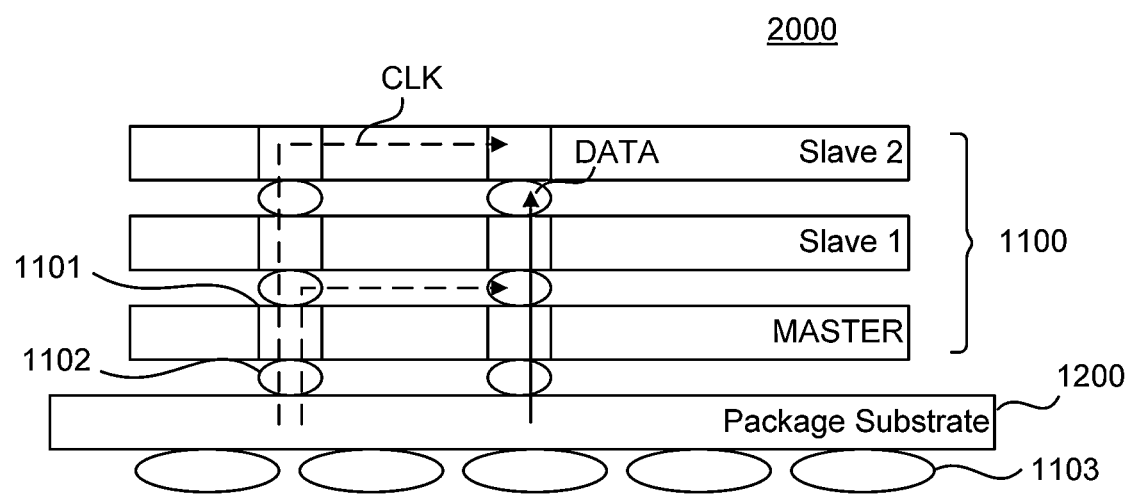

[FIG. 11]
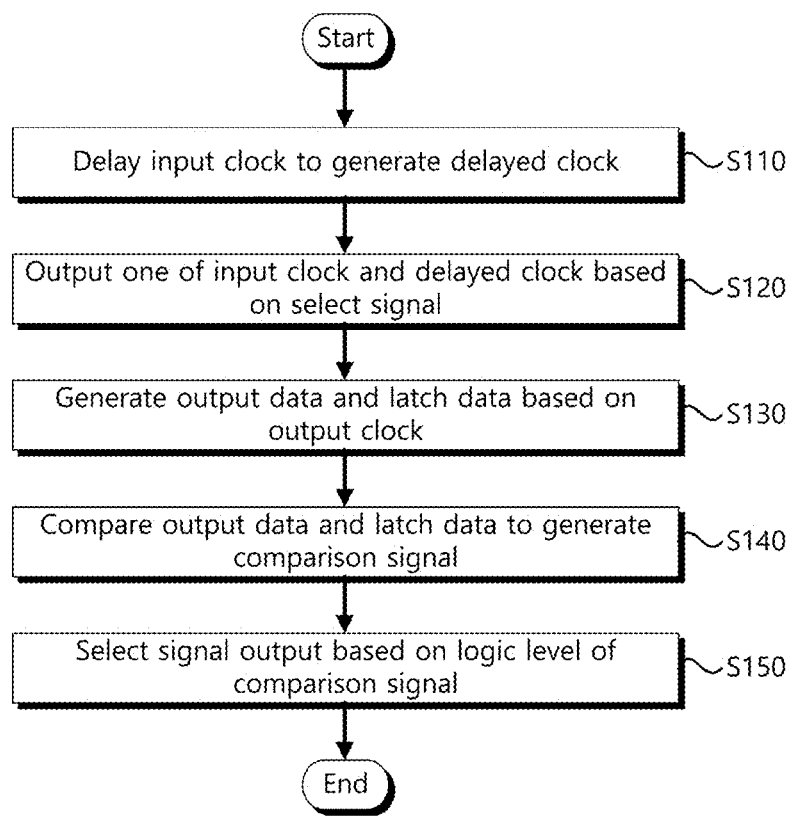

[FIG. 12]
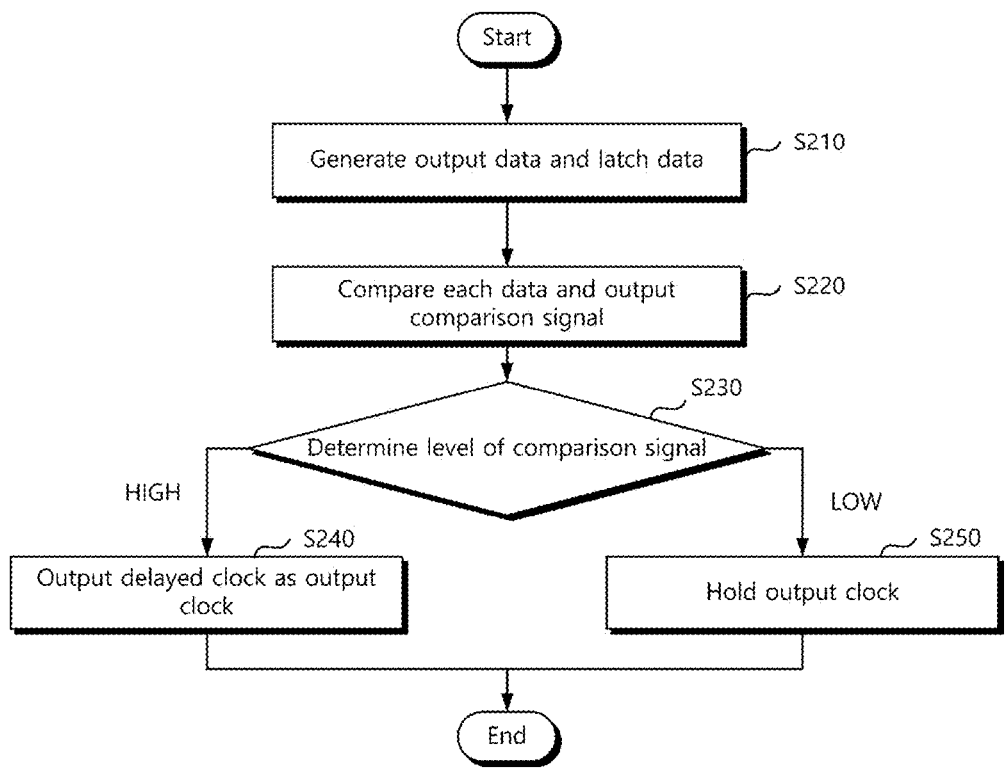

ERROR CORRECTION CIRCUIT CAPABLE OF AUTOMATICALLY COMPENSATING FOR CLOCK MARGIN AND METHOD OF OPERATING THE SAME

CROSS-REFERENCE TO RELATED APPLICATION(S)

This application claims benefit of priority to Korean Patent Application No. 10-2023-0029462, filed on Mar. 6, 2023, in the Korean Intellectual Property Office, the disclosure of which is incorporated herein by reference in its entirety.

BACKGROUND

Various example embodiments of the inventive concepts relate to an error correction circuit capable of automatically compensating for a margin of a clock, a system including the error correction circuit, and/or a method of operating the error correction circuit, etc.

As integration and complexity of memory devices increase and an interface transfer speed between chiplets increases, the importance of decreasing the sampling timing error of a reference clock provided from an external entity is increasing. Accordingly, there is a growing interest in a clock margin circuit and research into compensation of clock errors have been actively conducted.

SUMMARY

Various example embodiments provide a margin error correction circuit, a system including the margin error correction circuit, and/or a method of operating the margin error correction circuit, etc.

According to at least one example embodiment, an error correction circuit includes: a clock delay circuit configured to, receive an input clock, delay the input clock by a desired time period to generate a delayed clock, and output one of the input clock and the delayed clock as an output clock in response to a select signal, an error detection circuit configured to, receive the output clock and input data, generate output data and latch data based on the output clock and the input data, and detect a margin error based on the output data and the latch data, and a control circuit configured to correct the detected margin error, the correcting the margin error including adjusting a level of the select signal based on whether the margin error has been detected.

In at least one example embodiment, the error correction circuit is further configured to output a comparison signal based on a comparison of the output data and the latch data.

In at least one example embodiment, the error correction circuit is further configured to output the comparison signal at a high level during a time period in which the output data and the latch data are different from each other; and output the comparison signal at a low level during a time period in which the output data and the latch data are the same.

In at least one example embodiment, the clock delay circuit is further configured to hold an output clock in response to the comparison signal being at the low level.

In at least one example embodiment, the control circuit is connected to the clock delay circuit; and the control circuit is further configured to control the output clock in response to the select signal.

In at least one example embodiment, the error correction circuit may further include: an iterative sequential circuit configured to delay the input clock by the desired time period to generate an n-th delayed clock; and output one of the input clock and the n-th delay clock as an n-th output clock.

According to at least one example embodiment, a method of operating an error correction circuit may include: receiving an input clock, delaying the input clock by a desired time period to generate a delayed clock, outputting one of the input clock and the delayed clock as an output clock in response to a select signal, generating output data and latch data based on the output clock and received input data, detecting a margin error based on the output data and the latch data, and correcting the margin error, the correcting the margin error including adjusting a level of a select signal based on whether the margin error has been detected.

In at least one example embodiment, the detecting the margin error may include outputting a comparison signal based on a comparison of the output data and the latch data.

In at least one example embodiment, the outputting the comparison signal comprises outputting the comparison signal at a high level during a period in which the output data and the latch data are different from each other, and outputting the comparison signal at a low level during a time period in which the output data and the latch data are the same.

In at least one example embodiment, the outputting one of the input clock and the delayed clock as the output clock may include holding the output clock in response to the comparison signal being at the low level.

According to at least one example embodiment, a memory system may include, a first memory device configured to detect and control an error, and a repeater chain configured to transmit data received from the first memory device to a second memory device, wherein the first memory device is further configured to receive an input clock, delay the input clock by a desired time period to generate a delayed clock, output one of the input clock and the delayed clock as an output clock in response to a select signal, generate output data and latch data based on the output clock and received input data, detect a margin error based on the output data and the latch data, and correct the margin error by adjusting a level of the select signal based on whether the margin error has been detected.

BRIEF DESCRIPTION OF DRAWINGS

The above and other aspects, features, and advantages of various example embodiments of the inventive concepts will be more clearly understood from the following detailed description, taken in conjunction with the accompanying drawings.

FIG. 1 is a block diagram of an error correction circuit according to at least one example embodiment.

FIG. 2 is a circuit diagram illustrating an example of the error correction circuit of FIG. 1 according to at least one example embodiment.

FIGS. 3A to 3C are timing diagrams illustrating a margin error according to at least one example embodiment.

FIGS. 4A to 4B are timing diagrams illustrating operations of the error correction circuit of FIG. 2 according to at least one example embodiment.

FIG. 5 is a diagram illustrating another example of the error correction circuit of FIG. 1 according to at least one example embodiment.

FIG. 6 is a diagram illustrating another example of the error correction circuit of FIG. 1 according to at least one example embodiment.

FIGS. 7A to 7B are timing diagrams illustrating operations of the error correction circuit of FIG. 6 according to at least one example embodiment.

FIG. 8 is a block diagram of a memory system according to at least one example embodiment, illustrating a connection relationship between respective submodules.

FIG. 9 is a circuit diagram illustrating at least one example embodiment of a submodule in which an error correction circuit is included.

FIG. 10 is a diagram illustrating a semiconductor package according to at least one example embodiment.

FIG. 11 is a flowchart illustrating an example of an operation of the error correction circuit of FIG. 1 according to at least one example embodiment.

FIG. 12 is a flowchart illustrating an example of a feedback loop of the error correction circuit of FIG. 1 according to at least one example embodiment.

DETAILED DESCRIPTION

Hereinafter, various example embodiments will be described with reference to the accompanying drawings.

FIG. 1 is a block diagram of an error correction circuit according to at least one example embodiment.

Referring to FIG. 1, an error correction circuit 100 (e.g., error correction circuitry, etc.) according to at least one example embodiment may include a clock delay circuit unit 110 (e.g., a clock delay circuit, a clock delay subcircuit, etc.), an error detection circuit unit 120 (e.g., an error detection circuit, an error detection subcircuit, etc.), and/or a control circuit unit 130 (e.g., a control circuit, a control subcircuit, control processing circuitry, etc.), etc., but the example embodiments are not limited thereto. For example, the error correction circuit 100 may include a greater or lesser number of constituent components, etc. According to some example embodiments, the clock delay circuit unit 110, the error detection circuit unit 120, and/or the control circuit unit 130, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The clock delay circuit unit 110 may receive at least one input clock CLK_I (e.g., input clock signal, etc.). The clock delay circuit unit 110 may delay the input clock CLK_I by a desired and/or predetermined time (e.g., a desired amount of time, a desired time period, etc.) to generate a delayed clock CLK_D (e.g., delayed clock signal, etc.).

The clock delay circuit unit 110 may select one of the input clock CLK_I and the delayed clock CLK_D in response to a feedback loop signal, and may output a selected clock signal as an output clock CLK_O (e.g., output clock signal, etc.), but the example embodiments are not limited thereto. For example, the clock delay circuit unit 110 may select one of the input clock CLK_I and the delayed clock CLK_D in response to a select signal SEL received from the control circuit unit 130, but is not limited thereto.

The error detection circuit unit 120 may receive input data DATA_I (e.g., input data signal, etc.), but is not limited thereto. Also, the error detection circuit unit 120 may receive the output clock CLK_O from the clock delay circuit unit 110, etc. The error detection circuit unit 120 may detect whether a desired and/or preset margin has an error based on the output clock CLK_O and/or the input data DATA_I, etc., but the example embodiments are not limited thereto. To this end, the error detection circuit unit 120 may include a flip-flop, a latch, and/or a comparator, etc., but is not limited thereto.

The flip-flop may sample the input data DATA_I based on the output clock CLK_O, and may output the sampled input data DATA_I as output data DATA_O. For example, the flip-flop may sample the input data DATA_I at a rising edge of the output clock CLK_O, and may output the sampled input data DATA_I as the output data DATA_O, but is not limited thereto.

The latch may latch the input data DATA_I based on the output clock CLK_O, and may output the latched input data DATA_I as latch data DATA_L. For example, the latch may output the input data DATA_I as latch data DATA_L during a period in which the output clock CLK_O is in a high level and the input data DATA_I is in a high level, and may hold data during a period in which the output clock CLK_O is in a low level, but is not limited thereto.

The comparator may compare the output data DATA_O and the latch data DATA_L with each other, and may output a result of the comparison. For example, the comparator may generate and/or output a low-level comparison signal (e.g., a "0" data value, etc.) when the output data DATA_O and the latch data DATA_L are the same, but is not limited thereto. For example, the comparator may generate and/or output a high-level comparison signal (e.g., a "1" data value, etc.) when the output data DATA_O and the latch data DATA_L are different from each other, but is not limited thereto. However, the example embodiments are not limited thereto, and for example, the comparator may generate a high-level comparison signal in response to the output data DATA_O and the latch data DATA_L being the same, and generate a low-level comparison signal in response to the output data DATA_O and the latch data DATA_L being different, etc.

The control circuit unit 130 may receive a comparison signal from the error detection circuit unit 120, but is not limited thereto. The control circuit unit 130 may generate a select signal SEL based on a logic level of the comparison signal, and may provide the select signal SEL to the clock delay circuit unit 110, etc. For example, when the comparison signal is at a high level, the control circuit unit 130 may generate a high-level (e.g., a "1" data value) select signal SEL. For example, when the comparison signal is at a low level, the control circuit unit 130 may generate a low-level (e.g., a "0" data value) select signal SEL. However, the example embodiments are not limited thereto, and for example, the control circuit unit 130 may generate a high-level select signal SEL in response to the comparison signal being at a high level, and generate a low-level select signal SEL in response to the comparison signal being at a low level, etc.

In at least one example embodiment, a margin error may occur in the input clock CLK_I and/or the input data DATA_I, etc. In this case, the error detection circuit unit 120 may generate a high-level comparison signal and the control circuit unit 130 may generate a high-level select signal SEL, etc. The delay clock circuit unit 110 may delay the input clock CLK_I in response to the high-level select signal SEL and may output the delayed clock CLK_D as an output clock CLK_O. The error detection circuit unit 120 may sample the input data DATA_I based on the delay clock CLK_D to generate output data DATA_O. Thus, the margin error may be corrected.

In at least one example embodiment of the inventive concepts, a margin error may not occur in the input clock CLK_I and the input data DATA_I. In this case, the error detection circuit 120 may generate a low-level comparison signal and the control circuit unit 130 may generate a low-level select signal SEL. The delay clock circuit unit 110 may output an input clock CLK_I as an output clock CLK_O without delay, in response to the low-level select signal SEL. Thus, the output margin may be stably held.

As described above, the error correction circuit 100 according to at least one example embodiment may detect the occurrence of a margin error through a feedback loop, and may delay the input clock CLK_I when the margin error occurs, thereby correcting, automatically correcting, compensating for, etc., the margin error.

FIG. 2 is a circuit diagram illustrating an example of the error correction circuit of FIG. 1 according to at least one example embodiment.

Referring to FIG. 2, an error correction circuit 100A (e.g., error correction circuitry, etc.) may include a clock delay circuit unit 100 (e.g., a clock delay circuit, a clock delay subcircuit, etc.), an error detection circuit unit 110 (e.g., an error detection circuit, an error detection subcircuit, etc.), and/or a control circuit unit 130 (e.g., a control circuit, a control subcircuit, control processing circuitry, etc.), etc., but is not limited thereto.

The clock delay circuit unit 110 may receive the input clock CLK_I, and may output either one of the input clock CLK_I and/or a delayed clock CLK_D, etc. The clock delay circuit unit 110 may include a delay cell 111 and/or a multiplexer 112, but the example embodiments are not limited thereto.

The delay cell 111 may delay the input clock CLK_I by a desired and/or predetermined time and thereby generate a delay clock CLK_D (e.g., a delayed clock signal, etc.). For example, the delay cell 111 may set the delay time to be a time interval corresponding to a half cycle of the input clock CLK_I, but is not limited thereto. For example, a rising edge of the delay clock CLK_D generated by the delay cell 111 may correspond to a falling edge of the clock CLK_I, but the example embodiments are not limited thereto. However, this is an example only, and the delay time of the delay cell 111 may be variously set, configured, and/or changed according to the example embodiments.

The multiplexer 112 may be, for example, a 2-to-1 multiplexer having a first input terminal and a second input terminal, but is not limited thereto. The multiplexer 112 may receive an input clock CLK_I and a delayed clock CLK_D through the first input terminal and the second input terminal, respectively, etc. The multiplexer 112 may output one of the input clock CLK_I and the delayed clock CLK_D as an output clock CLK_O based on a select signal SEL, but is not limited thereto.

The error detection circuit unit 120 may detect an error of a desired and/or preset margin using the output clock CLK_O and/or input data DATA_I, etc. The error detection circuit unit 120 may include a flip-flop 121, a latch 122, and/or a comparator 123, etc., but the example embodiments are not limited thereto.

The flip-flop 121 may generate and/or transmit output data DATA_O based on the input data DATA_I and/or the output clock CLK_O, etc. For example, the flip-flop 121 may sample the input data DATA_I at a rising edge of the output clock CLK_O, and may output the sampled input data DATA_1 as the output data DATA_O, but the example embodiments are not limited thereto. For example, the flip-flop 121 may be implemented as a set/reset flip-flop in which a plurality of NOT gates are in cross-contact with each other, but is not limited thereto. However, this is only an example, and the flip-flop 121 may be implemented in various forms.

The latch 122 may output latch data DATA_L based on the input data DATA_I and/or the output clock CLK_O, etc. For example, the latch 122 may latch the input data DATA_I to output the latch data DATA_L during a time period in which the output clock is at a high level and the input data DATA_I is at a high level, and may hold latched data during a time period in which the output clock CLK_O is at a low level, but is not limited thereto. For example, the latch 122 may be implemented as a set/reset latch in which two NOR gates are in cross-contact with each other, etc. However, this is only an example, and the latch 122 may be implemented in various forms.

The comparator 123 may detect at least one margin error resulting from the output clock CLK_O through logic values of the output data DATA_O and the latch data DATA_L, etc. For example, the comparator 123 may output a low-level comparison signal XOR_OUT when the logic values of the output data DATA_O and the latch data DATA_L are equal to each other, and may output a high-level comparison signal XOR_OUT when the logic values of the output data DATA_O and the latch data DATA_L are different from each other, but the example embodiments are not limited thereto.

According to some example embodiments, the comparator 123 may be implemented as an exclusive-OR (XOR) logic gate, but the example embodiments are not limited thereto. The XOR gate may output a low-level comparison signal XOR_OUT when two input signals are the same, and may output a high-level comparison signal XOR_OUT when the two input signal are different from each other, etc. The comparison signal XOR_OUT, output from the comparator 123, may be input to the control circuit unit 130, but is not limited thereto.

The control circuit unit 130 may generate a select signal SEL based on a logic value of the comparison signal XOR_OUT, and may provide the select signal SEL to the clock delay circuit unit 110, etc. The control circuit unit 130 may include an output latch 131, but is not limited thereto.

The output latch 131 may receive a power supply voltage VCC and/or the comparison signal XOR_OUT, etc. Also, the output latch 131 may generate and hold the select signal SEL based on the comparison signal XOR_OUT of the comparator 123. For example, the output latch 131 may generate and hold the select signal SEL when the comparison signal XOR_OUT is at a high level, but is not limited thereto. The generated high-level select signal SEL may be input to the multiplexer 112 of the clock delay circuit unit 110, etc. The multiplexer 112 may output either one of the input clock CLK_I and the delayed clock CLK_D as an output clock CLK_O based on the select signal SEL.

The error correction circuit 100A according to at least one example embodiment may detect at least one margin error through a feedback loop, and may delay the input clock CLK_I to correct the detected margin error, etc. For example, the error correction circuit 100A according to at least one example embodiment may generate the output data DATA_O and/or the latch data DATA_L based on the output clock CLK_O, and may compare the output data DATA_O and the latch data DATA_L with each other to detect at least one margin error of a circuit, etc. When a margin error is detected, the error correction circuit 100A may output the delayed clock CLK_D as the output clock CLK_O to correct the detected margin error, etc.

FIGS. 3A to 3C are timing diagrams illustrating a margin error according to some example embodiments. For example, FIG. 3A is a timing diagram illustrating a case in which no margin error occurs, and FIGS. 3B and 3C are timing diagrams illustrating an of a case in which a margin error occurs, but the example embodiments are not limited thereto.

Referring to FIG. 3A, data DATA of FIG. 3A may be ideal data DATA (e.g., expected data, desired data, etc.) including a setup time T_SETUP (e.g., a setup sub-period, etc.) and a hold time T_HOLD (e.g., a hold sub-period, etc.) within a width of the data DATA around a rising edge of the clock CLK, but the example embodiments are not limited thereto. The setup time T_SETUP and the hold time T_HOLD of the data DATA may be variously set, configured, adjusted according to the example embodiments.

Referring to FIG. 3B, data DATA of FIG. 3B may be data DATA of which clock CLK is delayed on the right side as compared with the clock CLK of FIG. 3A. The data DATA of FIG. 3B may be data in which a hold time T_HOLD is violated (e.g., a margin error occurs, etc.) due to an occurrence of switching, etc., during the hold time T_HOLD, but the example embodiments are not limited thereto.

Referring to FIG. 3C, data DATA of FIG. 3C may be data DATA of which clock CLK is reduced on a left side as compared with the clock CLK of FIG. 3A. The data DATA of FIG. 3C may be data in which a setup time T_SETUP is violated (e.g., a margin error occurs, etc.) due to occurrence of switching in a setup time T_SETUP, but the example embodiments are not limited thereto.

Accordingly, the data DATA of FIG. 3B may not be recognized, and the data DATA of FIG. 3C may not be identified.

FIGS. 4A to 4B are timing diagrams illustrating operations of the error correction circuit of FIG. 2 according to some example embodiments. For example, FIG. 4A illustrates an example in which the error correction circuit of FIG. 2 detects a margin error, and FIG. 4B illustrates an example in which the error correction circuit of FIG. 2 corrects a margin error, but the example embodiments are not limited thereto.

Referring to FIG. 4A, the error correction circuit 100A may output an input clock CLK_I as an output clock CLK_O. The error correction circuit 100A may generate and/or transmit output data DATA_O and latch data DATA_L based on the input clock CLK_I and/or input data DATA_I, etc. For example, the error correction circuit 100A may output a comparison signal XOR_OUT based on the output data DATA_O and the latch data DATA_L, but the example embodiments are not limited thereto.

For the sake of clarity and ease of description, in FIGS. 4A and 4B it will be assumed that a hold margin error occurs because the input clock CLK_I is delayed. In addition, it will be assumed that the input data DATA_I is output as low data D0 and high data D1, and the low data D0 is "0" and the high data D1 is "1," but the example embodiments are not limited thereto.

At a first time point t1, the input clock CLK_I may transition from a low level (e.g., a low logic level, a low voltage level, etc.) to a high level (e.g., high logic level, a high voltage level, etc.), or in other words, a rising edge of the input clock CLK_I may occur.

At a second time point t2, the low data D0 of the input data DATA_I may be provided to the error correction circuit 100A, but the example embodiments are not limited thereto.

For example, the input data DATA_I may be provided to the flip-flop 121 and/or the latch 122, etc. Accordingly, the latch 122 may latch and output the low data D0 of the input data DATA_I.

At a third time point t3, the input clock CLK_I may transition from a high level to a low level (e.g., a falling edge of the input clock CLK_I may occur).

At a fourth time point t4, the input clock CLK_I may transition from a low level to a high level (e.g., a rising edge may occur). In this case, the flip-flop 121 may sample the input data DATA_I at the fourth time point t4 (for example, at the rising edge), etc. At the fourth time point t4, the input data DATA_I is the low data D0, so the flip-flop 121 may output the low data D0. Meanwhile, during the third time point t3 to the fourth time point t4, the input clock CLK_I is at a low level, so the latch 122 may hold low data D0 of previous input data DATA_I.

At a fifth time point t5, the high data D1 of the input data DATA_I may be provided to the error correction circuit 100A, but the example embodiments are not limited thereto. Thus, the latch 122 may latch and output the high data D1 of the input data DATA_I. Accordingly, the comparator 123 may output the comparison signal XOR_OUT as a high level at the fifth time point t5.

At a sixth time point t6, the input clock CLK_I may transition from a low level to a high level (e.g., a rising edge may occur). In this case, the flip-flop 121 may sample the input data DATA_I at the sixth time point t6 (for example, at the rising edge). At the sixth time point t6, the input data DATA_I is high data D1, so the flip-flop 121 may output the high data D1. Accordingly, at the sixth time point t6, the comparator 123 may output a low-level comparison signal XOR_OUT, etc.

As a result, when a margin error occurs, the error correction circuit 100A may output the comparison signal XOR_OUT at a high level at the fifth time point t5, so that the error correction circuit 100A may output a high-level select signal SEL at the fifth time point t5, but is not limited thereto.

Referring now to FIG. 4B, which is a continuation of the timing diagram of FIG. 4A, the error correction circuit 100A may output the delayed clock CLK_D as the output clock CLK_O based on the high-level select signal SEL. For example, when a margin error occurs, the delayed clock CLK_D may be output as the output clock CLK_O. The error correction circuit 100A may generate and/or transmit output data DATA_O and/or latch data DATA_L based on the output delayed clock CLK_D and the input data DATA_I, etc. The error correction circuit 100A may output a comparison signal XOR_OUT based on the output data DATA_O and/or the latch data DATA_L, etc.

At a seventh time point t7, the delayed clock CLK_D may transition from a high level to a low level (e.g., a falling edge may occur).

At an eighth time point t8, the low data D0 of the input data DATA_I may be provided to the error correction circuit 100A. For example, the input data DATA_I may be provided to the flip-flop 121 and the latch 122.

At a ninth time point t9, the delayed clock CLK_D may transition from a low level to a high level (e.g., a rising edge may occur). Accordingly, the latch 122 may latch and output the low data D0 of the input data DATA_I.

At a tenth time point t10, the delayed clock CLK_D may transition from a high level to a low level (e.g., a falling edge may occur). Accordingly, the latch 122 may hold the low data D0 of the input data DATA_I.

At an eleventh time point t11, the high data D1 of the input data DATA_I may be provided to the error correction circuit 100A.

At a twelfth time point t12, the delayed clock CLK_D may transition from a low level to a high level (e.g., a rising edge may occur). In this case, the flip-flop 121 may sample the input data DATA_I at the twelfth time point t12 (for example, at the rising edge). At the twelfth time point t12, the input data DATA_I is high data D1, so that the flip-flop 121 may output the high data D1. Meanwhile, the latch 122 may latch and output the high data D1 of the input data DATA_I. At the twelfth time point t12, the data of the flip-flop 121 and the latch 122 are the same, so that the comparator 123 may output a low-level comparison signal XOR_OUT.

As a result, the delayed clock CLK_D is selected as the output clock CLK_O, so that a comparison signal XOR_OUT is not output at a high level, which may allow the select signal SEL to be maintained at a low level. Accordingly, it may be determined that the margin error of the error correction circuit 100A has been corrected and/or decreased, etc. After the delayed clock CLK_D is output as the output clock CLK_O, the select signal SEL may transition from a high level to a low level. As an example, in FIG. 4B, the select signal SEL is illustrated as transitioning from a high level to a low level at an eighth time point t8. However, this is merely an example, and the select signal SEL may transition from a high level to a low level at any time point other than the eighth time point t8, etc.

In FIGS. 2 to 4D, the control circuit unit 130 has been described as including the output latch 131. However, this is merely an example, and some example embodiments are not limited thereto. As another example, the control circuit unit 130 may be implemented to include, for example, a flip-flop, etc.

FIG. 5 is a diagram illustrating another example of the error correction circuit of FIG. 1 according to at least one example embodiment.

FIG. 5 illustrates an example of an error correction circuit which may gradually increase a delay time until a margin error is corrected and/or reduced, etc. Referring to FIG. 5, an error correction circuit 100B may include a clock delay circuit unit 110_1, an error detection circuit unit 120, and/or a control circuit unit 130_1, etc., but the example embodiments are not limited thereto. According to some example embodiments, the clock delay circuit unit 110_1, the error detection circuit unit 120, and/or the control circuit unit 130_1, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The clock delay circuit unit 110_1 may include a plurality of delay cells 111_1 to 111_n and/or a plurality of multiplexers 112_1 to 112_n, etc., but is not limited thereto.

A first delay cell 111_1 may delay an input clock CLK_I by a desired and/or predetermined time. A first multiplexer 112_1 may receive the input clock CLK_I and the first delayed clock CLK_D_1. The first multiplexer 112_1 may output one of the input clock CLK_I and the first delayed clock CLK_D_1 as a first output clock CLK_O_1 based on a first select signal SEL_1.

A second delay cell 111_2 may delay the first output clock CLK_O_1 by a desired and/or predetermined time generate a second delayed clock CLK_D_1. For example, the first output clock CLK_O_1 may be the first delayed clock CLK_D_1, but is not limited thereto. The second multiplexer 112_2 may receive the first output clock CLK_O_1 and the second delayed clock CLK_D_2. The second multiplexer 112_2 may output one of the first output clock CLK_O_1 and the second delayed clock CLK_D_2 as the second output clock CLK_O_2 based on the second select signal SEL_2. In such a manner, the above-described operation may be repeatedly performed until at least one margin error is corrected and/or reduced, etc.

As described above, the clock delay circuit unit 110_1 may output a plurality of output clocks CLK_O_1 to CLK_O_n using the plurality of delay cells 111_1 to 111_n and the plurality of multiplexers 112_1 to 112_n.

The error detecting circuit unit 120 may detect whether a desired and/or preset margin of a data signal has an error, using an n-th output clock CLK_O_n and the input data DATA_I. The error detection circuit unit 120 may output a comparison signal XOR_OUT to detect a margin error of the data signal. The error detection circuit unit 120 may transmit the comparison signal XOR_OUT to the control circuit unit 130_1.

The control circuit unit 130_1 may include a plurality of output latches 131_1 to 131_n.

The first output latch 131_1 may receive a power supply voltage VCC and the comparison signal XOR_OUT. The first output latch 131_1 may generate the first select signal SEL_1 when the comparison signal XOR_OUT is at a high level, but is not limited thereto. The first output latch 131_1 may transmit the first select signal SEL_1 to the first multiplexer 112_1, but is not limited thereto.

The second output latch 131_2 may receive the first select signal SEL_1 and the comparison signal XOR_OUT. The second output latch 131_2 may generate the second select signal SEL_2 when the comparison signal XOR_OUT is at a high level. The second output latch 131_2 may transmit the second select signal SEL_2 to the second multiplexer 112_2, etc. In such a manner, the above-described operation may be repeatedly performed until the margin error is corrected and/or reduced, etc.

As described above, the control circuit unit 130_1 may output a plurality of select signals SEL_1 to SEL_n using the plurality of output latches 131_1 to 131_n, but the example embodiments are not limited thereto.

The error correction circuit 100B according to at least one example embodiment may detect a margin error through a feedback loop, and may gradually delay the input clock CLK_I until the margin error is corrected and/or reduced, etc. For example, the error correction circuit 100B according to at least one example embodiment may delay a clock until the comparison signal XOR_OUT is at a low level, but the example embodiments are not limited thereto. Accordingly, the error correction circuit 100B may include an iterative sequential circuit which may detect and/or continuously detect a margin error of the circuit and may reduce and/or correct the error, etc.

In FIG. 5, the control circuit unit 130_1 has been described as including a plurality of output latches 131_1 to 131_n. However, this is merely an example, and the example embodiments are not limited thereto. As another example, the control circuit unit 130_1 may be implemented to include a plurality of flip-flops, etc. In this case, a plurality of flip-flops may be implemented to be connected to each other in parallel, but is not limited thereto.

FIG. 6 is a diagram illustrating another example of the error correction circuit of FIG. 1 according to at least one example embodiment.

FIG. 6 illustrates a connection configuration of a delayed clock CLK_D and an example in which an inductor and a second flip-flop 124 are further provided, but the example embodiments are not limited thereto. The configurations of FIG. 6, other than the above configuration, are similar to those of FIGS. 1 and 2. Therefore, the same or similar components are denoted by the same or similar reference numerals, and redundant descriptions will be omitted below.

Referring to FIG. 6, the error correction circuit 100C may include a clock delay circuit unit 110_2, an error detection circuit unit 120_1, and/or a control circuit unit 130, etc. According to some example embodiments, the clock delay circuit unit 110_2, an error detection circuit unit 120_1, and/or a control circuit unit 130, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The clock delay circuit unit 110_2 may include a delay cell 111 and/or a multiplexer 112, etc., but is not limited thereto. The multiplexer 112 may input a delayed clock CLK_D and an input clock CLK_I to a first input terminal and a second input terminal, respectively. The multiplexer 112 may output one of the delayed clock CLK_D and the input clock CLK_I as an output clock CLK_O based on a select signal SEL.

The error detection circuit unit 120_1 may receive input data DATA_I. Also, the error detection circuit unit 120_1 may receive the output clock CLK_O from the clock delay circuit unit 110_2. The error detection circuit unit 120_1 may detect whether a desired and/or preset margin error is present in the input data DATA_I, using the output clock CLK_O and the input data DATA_I. To this end, the error detection circuit unit 120_1 may include a first flip-flop 121, a latch 122_1, and/or a comparator 123, and may further include a second flip-flop 124, etc., but the example embodiments are not limited thereto.

The latch 122_1 of the error detection circuit unit 120_1 may further include an inverter, etc. Accordingly, the latch 122_1 may output the latch data DATA_L based on a clock (e.g., a latch clock, etc.) having a phase difference opposite to that of the output clock CLK_O. In other words, the latch clock signal may have a phase which is different from the phase of the output clock CLK_O, and/or the latch clock signal is inverted from the output clock CLK_O, etc.

The second flip-flop 124 of the error detection circuit unit 120_1 may output flip-flop data DATA_F based on the latch data DATA_L and the output clock CLK_O. For example, the second flip-flop 124 may sample the latch data DATA_L at a rising edge of the output clock CLK_O, and may output the sampled latch data DATA_L as flip-flop data DATA_F, but is not limited thereto.

The comparator 123 of the error detection circuit unit 120_1 may detect a margin error, resulting from the output clock CLK_O, through logic values of the output data DATA_O and the flip-flop data DATA_F, etc. For example, when the logic values of the output data DATA_O and the flip-flop data DATA_F are the same, the comparator 123 may output a low-level comparison signal XOR_OUT, and when the logic values of the output data DATA_O and the flip-flop data DATA_F are different from each other, the comparator 123 may output the comparison signal XOR_OUT at a high level, but the example embodiments are not limited thereto.

The error correction circuit 100C according to at least one example embodiment may generate latch data DATA_L using a clock having a phase difference opposite to that of the output clock CLK_O, and may compare the output data DATA_O and the flip-flop data DATA_F with each other to detect and correct a setup error margin, etc.

FIGS. 7A to 7B are timing diagrams illustrating operations of the error correction circuit of FIG. 6 according to at least one example embodiment. FIG. 7A illustrates an example in which the error correction circuit of FIG. 6 detects a margin error, and FIG. 7B illustrates an example in which the error correction circuit of FIG. 6 corrects the margin error, but the example embodiments are not limited thereto.

For the sake of clarity and ease of description, in FIGS. 7A and 7B, it will be assumed that a setup margin error occurs because a delayed clock CLK_D is delayed, but the example embodiments are not limited thereto. In addition, input data DATA_I may be output as low data D0 and high data D1.

Referring to FIG. 7A, the error correction circuit 100C may output a delayed clock CLK_D as an output clock CLK_O. The error correction circuit 100C may output output data DATA_O and/or flip-flop data DATA_F based on the output delayed clock CLK_D and the input data DATA_I. Accordingly, the error correction circuit 100C may output a comparison signal XOR_OUT based on the output data DATA_O and the flip-flop data DATA_F.

At a first time point t1, the delayed clock CLK_D may transition from a high level to a low level (e.g., a falling edge may occur).

At a second time point t2, the low data D0 of the input data DATA_I may be provided to the error correction circuit 100C. For example, the input data DATA_I may be provided to the first flip-flop 121 and/or the latch 122_1, etc.

At a third time point t3, the delayed clock CLK_D may transition from a low level to a high level (e.g., low logic level to a high logic level, etc.). In this case, the first flip-flop 121 may sample the input data DATA_I at the third time point t3 (for example, at the rising edge), but is not limited thereto. At the third time point t3, the input data DATA_I is the low data D0, so the first flip-flop 121 may output the low data D0, etc.

At a fourth time point t4, the delayed clock CLK_D may transition from a high level to a low level (e.g., a falling edge may occur). In this case, the latch 122_1 may sample the input data DATA_I at the fourth time point t4 (for example, at the falling edge). At the fourth time point t4, the input data DATA_I is low data D0, so the latch 122_1 may output the low data D0.

At a fifth time point t5, the delayed clock CLK_D may transition from a low level to a high level (e.g., a rising edge may occur). In this case, the first flip-flop 121 may sample the input data DATA_I at the fifth time point t5 (for example, at the rising edge), but is not limited thereto. At the fifth time point t5, the input data DATA_I is high data D1, so the first flip-flop 121 may output the high data D1. The second flip-flop 124 may sample the latch data DATA_L at the fifth time point t5 (for example, at the rising edge). At the fifth time point t5, the latch data DATA_L is low data D0, the second flip-flop 124 may output the low data D0. Accordingly, the comparator 123 may output a high-level comparison signal XOR_OUT at the fifth time point t5.

As a result, when a margin error occurs, the error correction circuit 100C may output the high-level comparison signal XOR_OUT at the fifth time point t5, and thus may output a high-level select signal SEL at the fifth time point t5, but is not limited thereto.

Referring now to FIG. 7B, which is a continuation of the timing diagram of FIG. 7A, the error correction circuit 100C may output the input clock CLK_I as the output clock CLK_O based on the high-level select signal SEL. For example, when a margin error occurs, the error correction circuit 100C may output the input clock CLK_I as the output clock CLK_O, but is not limited thereto. In addition, the error correction circuit 100C may output output data DATA_O and flip-flop data DATA_F based on the input clock CLK_I and the input data DATA_I. Accordingly, the error correction circuit 100C may output the comparison signal XOR_OUT based on the output data DATA_O and the flip-flop data DATA_F.

At a sixth time point t6, the input clock CLK_I may transition from a low level to a high level (e.g., a rising edge may occur).

At a seventh time point t7, the low data D0 of the input data DATA_I may be provided to the error correction circuit 100C. For example, the input data DATA_I may be provided to the first flip-flop 121 and the latch 122_1.

At an eighth time point t8, the input clock CLK_I may transition from a high level to a low level (e.g., a falling edge may occur). In this case, the latch 122_1 may sample the input data DATA_I at the eighth time point t8 (for example, at the falling edge). At the eighth time point t8, the input data DATA_I is low data D0, so the latch 122_1 may output the low data D0.

At a ninth time point t9, the input clock CLK_I may transition from a low level to a high level (e.g., a rising edge may occur). In this case, the first flip-flop 121 may sample the input data DATA_I at the ninth time point t9 (for example, at the rising edge). At the ninth time point t9, the input data DATA_I is low data D0, the first flip-flop 121 may output the low data D0. The second flip-flop 124 may sample the latch data DATA_L at the ninth time point t9 (for example, at the rising edge). At the ninth time point t9, the latch data DATA_L is low data D0, the second flip-flop 124 may output the low data D0. At the ninth time point t9, the data of the first flip-flop 121 and the second flip-flop 124 are the same, so the comparator 123 may output a low-level comparison signal XOR_OUT, etc.

As a result, the input clock CLK_I is selected as the output clock CLK_O, so a comparison signal XOR_OUT may not output at a high level, which may allow the select signal SEL to be maintained at a low level. Accordingly, it may be determined that the margin error of the error correction circuit 100C has been decreased and/or corrected. After the input clock CLK_I is output as the output clock CLK_O, the select signal SEL may transition from a high level to a low level. As an example, in FIG. 7B, the select signal SEL is illustrated as transitioning from a high level to a low level at the sixth time point t6. However, this is merely an example, and the select signal SEL may transition from a high level to a low level at any time point other than the sixth time point t6, etc.

In FIGS. 6 to 7D, the control circuit unit 130 has been described as including the output latch 131. However, this is merely an example, and some example embodiments are not limited thereto. As another example, the control circuit unit 130 may be implemented to include a flip-flop.

FIG. 8 is a block diagram of a memory system according to at least one example embodiment, illustrating a connection relationship between respective submodules (e.g., sub-components, sub-circuits, etc.) of the memory system.

Referring to FIG. 8, a memory system 1000 may include a plurality of submodules 200 (e.g., circuitry, processing circuitry, etc.) and a repeater chain 300, etc., but the example embodiments are not limited thereto, and for example, the memory system 1000 may include a greater or lesser number of constituent components, etc. Each of the submodules 200 may be a module (e.g., circuitry, sub-circuitry, etc.) including a semiconductor memory device which may be simply clocked and may detect and/or control an error, such as a margin error, etc. The submodules 200 may be connected to the repeater chain 300, but the example embodiments are not limited thereto. The repeater chain 300 may have a function of transmitting data, received from a submodule and/or a semiconductor memory device in a previous stage, to a submodule in a next stage, etc., but is not limited thereto.

The error correction circuit according to at least one example embodiment may be applied to the submodule 200 (e.g., a first memory device, etc.) on a transmission side and/or the submodule 200 on a reception side (e.g., a second memory device, etc.).

FIG. 9 is a circuit diagram illustrating at least one example embodiment of a submodule in which an error correction circuit is included.

FIG. 9 illustrates an example of a submodule 200 in which an error correction circuit 100 is included, but is not limited thereto. An error correction circuit 100, an output latch 220, and/or a delay cell 230, etc., of FIG. 9 are similar to those of FIGS. 1 and 2, but the example embodiments are not limited thereto. Therefore, the same or similar components are denoted by the same or similar reference numerals, and redundant descriptions will be omitted below.

Referring to FIG. 9, a submodule 200 may receive input data DATA_I and input clock CLK_I, and may further receive input correction data DATA_I_CAL, etc.

The input clock CLK_I and/or the input correction data DATA_I_CAL may be transmitted to the error correction circuit 100, etc. The input correction data DATA_I_CAL may be replica data of the input data DATA_I, but is not limited thereto. The input correction data DATA_I_CAL may be delayed by a desired and/or predetermined time through the delay cell 230, and may be then input to the error correction circuit 100, etc.

The error correction circuit 100 may detect at least one margin error using the input clock CLK_I and/or the input correction data DATA_I_CAL, etc. Accordingly, the error correction circuit 100 may output an error-corrected output clock CLK_O and/or output correction data DATA_O_CAL. The output clock CLK_O may be input to the latch 220.

The latch 220 may receive the sampling data DATA_S and the output clock CLK_O to generate and/or transmit output data DATA_O. The sampling data DATA_S may be input data DATA_I sampled based on an instruction (e.g., computer readable instruction, a selection signal, etc.) of the data combination unit 210, but the example embodiments are not limited thereto. The instruction may be, for example, an instruction for sorting bits of the input data DATA_I in units of packets and sampling the sorted bits, and/or an instruction for sampling data from the input data DATA_I into a plurality of pieces of data having different phase differences, etc.

The error correction circuit 100 of the submodule 200 according to at least one example embodiment does not require (and/or may omit) an additional timing mode register set (TMRS) and/or an external clock, so that a physical area desired for correcting a margin error may be significantly reduced and/or a power burden may also be reduced, etc.

FIG. 10 is a diagram illustrating a semiconductor package according to at least one example embodiment.

FIG. 10 is a diagram illustrating a semiconductor package according to at least one example embodiment.

Referring to FIG. 10, a semiconductor package 2000 may include a memory system 1000, a stacked memory device 1100, a printed circuit board (PCB) 1200, a through-silicon via (TSV) 1101, a bump 1102, and/or a solder ball 1103, etc., but the example embodiments are not limited thereto.

A plurality of layers of the stacked memory device 1100 may be electrically connected to each other through the TSV 1101 and/or the bump 1102, etc., but is not limited thereto. For example, a clock signal CLK and/or data signal DATA of the PCB 1200 may be applied to each of the layers, but the example embodiments are not limited thereto. Also, the stacked memory device 1100 may be stacked on the package substrate 1200, but is not limited thereto. A plurality of bumps 1102 may be attached to an upper portion of the package substrate 1200 and/or solder balls 1103 may be attached to a lower portion of the package substrate 1200, etc. For example, the bumps 1102 may be flip-chip bumps, but is not limited thereto. The layers may be stacked on the package substrate 1200 through the bumps 1102. The semiconductor package 2000 may transmit and/or receive signals to and/or from other external packages and/or semiconductor devices through the solder balls 1103, etc. For example, the package substrate 1200 may be a printed circuit board (PCB), but is not limited thereto.

In at least one example embodiment, in the semiconductor package 2000, the stacked memory device 1100 may be stacked on the package substrate 1200, etc. The stacked memory device 1100 may transmit and/or receive clock CLK and/or data DATA through the TSV 1101, etc. Accordingly, as described with reference to FIGS. 1 to 10, the stacked memory device 1100 may correct a circuit error based on the clock cycle CLK and may sample the data DATA, but the example embodiments are not limited thereto.

FIG. 11 is a flowchart illustrating an example of an operation of the error correction circuit of FIG. 1 according to at least one example embodiment.

In operation S110, the clock delay circuit 110 may receive an input clock CLK_I, and the clock delay circuit 110 may delay the input clock CLK_I by a desired and/or predetermined time through the delay cell 111 to generate a delayed clock CLK_D, but the example embodiments are not limited thereto.

In operation S120, the input clock CLK_I may be connected and/or transmitted to a first input terminal of the multiplexer 112, and the delayed clock CLK_D may be connected and/or transmitted to a second input terminal of the multiplexer 112. Also, the multiplexer 112 may output one of the input clock CLK_I and the delayed clock CLK_D as an output clock CLK_O based on a select signal SEL.

In operation S130, the error detection circuit unit 120 may generate and/or transmit output data DATA_O and latch data DATA_L based on the output clock CLK_O from the flip-flop 121 and the latch 122, etc.

In operation S140, the error detection circuit unit 120 may compare the output data DATA_O and the latch data DATA_L with each other to generate and/or output a comparison signal XOR_OUT based on the output data DATA_O and the latch data DATA_L, etc.

In operation S150, the control circuit unit 130 may output the select signal SEL based on a logic level of the comparison signal XOR_OUT of the error detection circuit unit 120.

FIG. 12 is a flowchart illustrating an example of a feedback loop of the error correction circuit of FIG. 1 according to at least one example embodiment.

In operation S210, the error detection circuit unit 120 may generate output data DATA_O and latch data DATA_L based on an output clock CLK_O.

In operation S220, the error detection circuit unit 120 may connect and/or transmit the output data DATA_O and/or the latch data DATA_L to the comparator 123. The comparator 123 may determine whether the output data DATA_O and the latch data DATA_L match each other through logic circuitry and output a comparison signal XOR_OUT based on results of the comparison, etc.

In operation S230, the control circuit unit 130 may output a select signal SEL based on a logic level of the comparison signal XOR_OUT.

In operation S240, when the select signal SEL is at a high level, the clock delay circuit unit 110 may output a delayed clock DATA_D as output clock DATA_O.

In operation S250, when the select signal SEL is at a low level, the clock delay circuit unit 110 may hold the output clock DATA_O.

As set forth above, according to one or more example embodiments, an error correction circuit may correct a reference clock when a margin error occurs and/or is detected, thereby improving and/or automatically improving a margin of the reference clock without using additional clocks, etc.

While various example embodiments have been shown and described above, it will be apparent to those skilled in the art that modifications and variations could be made to the example embodiments without departing from the scope of the inventive concepts as defined by the appended claims.

What is claimed is:

1. An error correction circuit comprising:
   a clock delay circuit configured to,
     receive an input clock,
     delay the input clock by a desired time period to generate a delayed clock, and
     output one of the input clock and the delayed clock as an output clock in response to a select signal;
   an error detection circuit configured to,
     receive the output clock and input data,
     generate output data and latch data based on the output clock and the input data, and
     detect a margin error based on the output data and the latch data; and
   a control circuit configured to correct the detected margin error, the correcting the margin error including adjusting a level of the select signal based on whether the margin error has been detected.

2. The error correction circuit of claim 1, wherein the error correction circuit is further configured to:
   output a comparison signal based on a comparison of the output data and the latch data.

3. The error correction circuit of claim 2, wherein the error correction circuit is further configured to:

output the comparison signal at a high level during a time period in which the output data and the latch data are different from each other; and
output the comparison signal at a low level during a time period in which the output data and the latch data are the same.

4. The error correction circuit of claim 3, wherein the clock delay circuit is further configured to:
hold an output clock in response to the comparison signal being at the low level.

5. The error correction circuit of claim 1, wherein
the control circuit is connected to the clock delay circuit; and
the control circuit is further configured to control the output clock in response to the select signal.

6. The error correction circuit of claim 1, further comprising:
an iterative sequential circuit configured to,
delay the input clock by the desired time period to generate an n-th delayed clock; and
output one of the input clock and the n-th delay clock as an n-th output clock.

7. The error correction circuit of claim 1, further comprising:
a circuit configured to,
generate the latch data based on a latch clock having a phase different from a phase of the output clock, the phase of the latch clock being opposite to the phase of the output clock; and
output the select signal based on a comparison of the output data and the latch data.

8. The error correction circuit of claim 1, wherein the margin error is at least one of:
a hold margin error, a setup margin error, or a combination thereof.

9. A method of operating an error correction circuit, the method comprising:
receiving an input clock;
delaying the input clock by a desired time period to generate a delayed clock;
outputting one of the input clock and the delayed clock as an output clock in response to a select signal;
generating output data and latch data based on the output clock and received input data;
detecting a margin error based on the output data and the latch data; and
correcting the margin error, the correcting the margin error including adjusting a level of a select signal based on whether the margin error has been detected.

10. The method of claim 9, wherein the detecting the margin error comprises:
outputting a comparison signal based on a comparison of the output data and the latch data.

11. The method of claim 10, wherein the outputting the comparison signal comprises:
outputting the comparison signal at a high level during a period in which the output data and the latch data are different from each other; and
outputting the comparison signal at a low level during a time period in which the output data and the latch data are the same.

12. The method of claim 11, wherein the outputting one of the input clock and the delayed clock as the output clock comprises:
holding the output clock in response to the comparison signal being at the low level.

13. The method of claim 11, wherein the outputting one of the input clock and the delayed clock as the output clock comprises:
outputting the delayed clock as the output clock in response to the comparison signal being at the high level.

14. The method of claim 9, wherein the outputting one of the input clock and the delayed clock as the output clock comprises:
delaying the input clock by a desired time unit a desired number of times corresponding to the desired time period.

15. The method of claim 9, wherein the detecting the margin error comprises:
generating the latch data based on a latch clock having a phase different than a phase of the output clock, the phase of the latch clock being opposite to the phase of the output clock; and
outputting the select signal based on a comparison of the output data and the latch data.

16. The method of claim 9, wherein the margin error is at least one of:
a hold margin error, a setup margin error, or a combination thereof.

17. A memory system comprising:
a first memory device configured to detect and control an error; and
a repeater chain configured to transmit data received from the first memory device to a second memory device,
wherein
the first memory device is configured to,
receive an input clock,
delay the input clock by a desired time period to generate a delayed clock,
output one of the input clock and the delayed clock as an output clock in response to a select signal,
generate output data and latch data based on the output clock and received input data,
detect a margin error based on the output data and the latch data, and
correct the margin error by adjusting a level of the select signal based on whether the margin error has been detected.

18. The memory system of claim 17, wherein the first memory device is further configured to:
detect an error based on a comparison signal of the output data and the latch data, and
wherein the comparison signal has a high level during a time period in which the output data and the latch data are different from each other, and the comparison signal has a low level during a period in which the output data and the latch data are the same.

19. The memory system of claim 17, wherein the first memory device is further configured to:
control the output clock in response to the select signal.

20. The memory system of claim 17, further comprising:
an iterative sequential circuit configured to,
delay the input clock by the desired time period to generate an n-th delayed clock; and
output one of the input clock and the n-th delay clock as an n-th output clock.

* * * * *